United States Patent
Yu et al.

(10) Patent No.: US 10,843,626 B2
(45) Date of Patent: Nov. 24, 2020

(54) WARNING SYSTEM FOR DETECTING APPROACHING VEHICLE AND METHOD THEREOF

(71) Applicant: CUBTEK INC., Zhubei (TW)

(72) Inventors: San-Chuan Yu, Zhubei (TW); Cheng-Foo Chen, Zhubei (TW); Chi-Yu Hung, Zhubei (TW); Jyong Lin, Zhubei (TW); Yu-Jen Lin, Zhubei (TW)

(73) Assignee: CUBTEK INC., Hsinchu County (TW)

( * ) Notice: Subject to any disclaimer, the term of this patent is extended or adjusted under 35 U.S.C. 154(b) by 0 days.

(21) Appl. No.: 16/287,205

(22) Filed: Feb. 27, 2019

(65) Prior Publication Data
US 2020/0269758 A1    Aug. 27, 2020

(51) Int. Cl.
*B60Q 9/00* (2006.01)
*B60W 50/00* (2006.01)

(52) U.S. Cl.
CPC ......... *B60Q 9/008* (2013.01); *B60W 50/0097* (2013.01); *B60W 2520/06* (2013.01); *B60W 2554/00* (2020.02)

(58) Field of Classification Search
CPC .............. B60Q 9/008; B60W 50/0097; B60W 2520/06; B60W 2550/10
USPC .................................................. 340/435–436
See application file for complete search history.

(56) References Cited

U.S. PATENT DOCUMENTS

| | | | | |
|---|---|---|---|---|
| 5,959,552 A * | 9/1999 | Cho | ...................... | G01S 13/931 340/903 |
| 6,288,651 B1 * | 9/2001 | Souza | ...................... | E01F 9/688 200/86 A |
| 6,512,451 B1 * | 1/2003 | Eslambolchi | ........... | E01F 9/688 340/425.5 |
| 7,230,546 B1 * | 6/2007 | Nelson | ...................... | G08G 1/01 340/907 |
| 7,538,688 B1 * | 5/2009 | Stewart | ................. | E01F 13/028 116/63 C |
| 8,237,555 B2 * | 8/2012 | McCarthy | ................. | G08G 1/01 340/435 |
| 9,365,155 B2 * | 6/2016 | Hathaway | .............. | G08G 1/162 |
| 9,466,216 B2 * | 10/2016 | Frederick | ............... | B60Q 9/008 |
| 9,489,841 B1 * | 11/2016 | Huggins | ................ | G08G 1/056 |
| 9,792,820 B1 * | 10/2017 | Russell, Jr. | ............ | H04R 1/028 |
| 9,940,839 B2 * | 4/2018 | Stafford | ................. | G08G 1/097 |
| 10,319,227 B2 * | 6/2019 | Roy | ....................... | G09F 21/048 |
| 2012/0126996 A1 * | 5/2012 | McCarthy | .............. | G08G 1/052 340/902 |

\* cited by examiner

*Primary Examiner* — Eric Blount
(74) *Attorney, Agent, or Firm* — Muncy, Geissler, Olds & Lowe, P.C.

(57) ABSTRACT

A warning system for detecting approaching vehicle and method thereof are provided. The system includes a detection unit detecting a relative distance with respect to the approaching vehicle and a driving path of the approaching vehicle; a storage unit storing a warning information; and a processing unit receiving the detection signal to acquire the current time to collision and the current driving path. When the time to collision is equal to or shorter than the predetermined time to collision, and the driving path falls in the warning area, and the driving path fulfills the confirmation condition, the processing unit sends a warning signal. Therefore, a potentially dangerous approaching vehicle is accurately judged, and the warning is correctly sent.

16 Claims, 7 Drawing Sheets

WARNING SYSTEM FOR DETECTING APPROACHING VEHICLE AND METHOD THEREOF

BACKGROUND OF THE INVENTION

1. Field of the Invention

The present invention relates to warning systems, and more particularly, to a warning system for detecting approaching vehicle and method thereof.

2. Description of the Related Art

Radar systems, such as blind spot detection systems, rear crash collision warning systems, and pre-crash systems, have been widely applied on intelligent vehicles, such as an application of advanced driver assistance system (ADAS). Radar systems aim are applied for preventing the vehicle from having collision with other people or objects, so as to ensure the driving safety.

However, when a vehicle which is broken down stops at the roadside, other vehicles approaching from behind often accidentally collides the broken down vehicle, causing the injury or even death of the people inside or beside the broken down vehicle. Additionally, when the police places barricades at the road for executing a roadside check or applies a vehicle body as a cover for conducting a strike operation at a crime scene, policemen are often hurt by the collision of the vehicle body due to the unawareness upon other fast approaching vehicles.

A conventional detection warning system is statically placed for preventing the collision caused by other approaching vehicles. The radar detects the speed or distance of an approaching vehicle, thereby determining if the approaching vehicle is a potentially dangerous vehicle. However, when the approaching speed or distance of the approaching vehicle reaches a predetermined range, the alarm will be sounded even if the approaching vehicle moves away toward other directions or the driving path of the approaching vehicle is deemed to be non-threatening. As a result, the people at the scene will misjudge the approaching vehicle as a dangerous vehicle for the driving, further causing fear or panic.

Therefore, it is desirable for the industry to resolve the issues of misjudging the approaching vehicle as a dangerous vehicle.

SUMMARY OF THE INVENTION

For improving the issues above, a warning system for detecting approaching vehicle and the method thereof are disclosed. By detecting the relative distance with respect to the approaching vehicle to acquire a time to collision (TTC) and detecting the driving path of the approaching vehicle, when the time to collision falls in the predetermined range and the driving path falls in the warning area, with other conditions being fulfilled, the processing unit outputs the warning signal for providing the warning.

For achieving the aforementioned objectives, a warning system for detecting an approaching vehicle in accordance with the present invention is provided, comprising:

a detection unit detecting a relative distance with respect to the approaching vehicle in a detection area to acquire a time to collision, and detecting a driving path of the approaching vehicle, such that the time to collision and the driving path are transformed into a detection signal which is then output;

a storage unit storing a warning information, the warning information including a predetermined time to collision, a warning area set in the detection area, and a confirmation condition for confirming that the approaching vehicle continuously moves in the warning area; and a processing unit electrically connected with the detection unit and the storage unit, the processing unit receiving the detection signal to acquire the current time to collision and the current driving path;

when the time to collision is equal to or shorter than the predetermined time to collision, and the driving path falls in the warning area, and the driving path fulfills the confirmation condition, the processing unit sends a warning signal.

Also, a warning method for detecting an approaching vehicle in accordance with the present invention is provided, comprising:

detecting a relative distance with respect to the approaching vehicle in a detection area to acquire a time to collision and detecting a driving path of the approaching vehicle with a detection unit, transforming the time to collision and the driving path into a detection signal, and outputting the detection signal;

storing a warning information with a storage unit, the warning information including a predetermined time to collision, a warning area set in the detection area, and a confirmation condition for confirming that the approaching vehicle continuously moves in the warning area;

receiving the detection signal with a processing unit which is electrically connected with the detection unit and the storage unit to acquire the current time to collision and the current driving path of the approaching vehicle, such that when the time to collision is equal to or shorter than the predetermined time to collision, and the driving path falls in the warning area, and the driving path fulfills the confirmation condition, the processing unit sends a warning signal.

Therefore, for an approaching vehicle to be determined as a potentially dangerous vehicle, multiple requirements must be met. The time to collision detected from the approaching vehicle must fall in a range of the predetermined time to collision; the driving path of the approaching vehicle must fall in the warning area; and the confirmation condition shall be fulfilled to assure that the approaching vehicle is moving in the warning area. When such requirements are met, the approaching vehicle is then determined as a potentially dangerous vehicle, and the processing unit will then send out the warning signal. Therefore, the issue of misjudging a dangerous vehicle is resolved, thus preventing people at the scene from fearing or panicking due to an incorrect judgement.

DETAILED DESCRIPTION OF THE INVENTION

Figure 1:
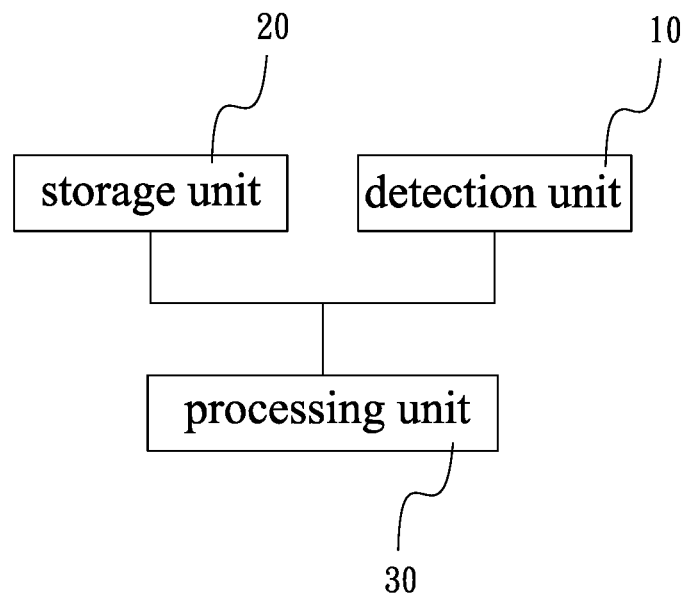
FIG. 1 is a block diagram of the warning system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 7, a warning system for detecting an approaching vehicle V and method thereof are provided. The warning system 100 for detecting an approaching vehicle V comprises a detection unit 10, a storage unit 20, and a processing unit 30. The warning system 100 is statically disposed on a malfunctioned vehicle (not shown) or applied as a traffic cone for detecting an approaching vehicle V. The warning method for detecting the approaching vehicle V will be illustrated below together with the warning system.

The detection unit 10 detects a relative distance with respect to the approaching vehicle V in a detection area (not shown) to acquire a time to collision (TTC). Also, the detection unit 10 detects a driving path P of the approaching vehicle V. Then the time to collision and the driving path P are transformed into a detection signal which is to be output. To acquire the time to collision, in an embodiment of the present invention, after the relative distance with respect to the detection unit 10 is detected, the relative distance is differentiated to acquire a relative speed of the approaching vehicle V; next, the relative distance is divided by the relative speed, so as to acquire the time to collision. In an embodiment of the present invention, the detection unit 10 is a radar module.

The storage unit 20 is applied for saving a warning information, wherein the warning information includes a predetermined time to collision, a warning area L, and a confirmation condition. The warning area L is set in the detection area. The confirmation condition is applied for confirming that the approaching vehicle V keeps moving in the warning area L. The predetermined time to collision is set as 3.5 second.

The processing unit 30 is electrically connected with the detection unit 10 and the storage unit 20 for receiving the detection signal output by the detection unit 10, so as to acquire the current time to collision and the current driving path P. The processing unit 30 will only send the warning signal if the current time to collision is equal to or shorter than the predetermined time to collision, and the driving path P falls in the warning area L, and the driving path P fulfills the confirmation condition.

In an embodiment of the present invention, the confirmation condition is a predetermined count value. When the approaching vehicle V enters the warning area L, a current count value will starts to count. If the current count value reaches the predetermined count value, the processing unit 30 determines that the driving path P of the approaching vehicle V fulfills the confirmation condition in the warning area L. On the contrary, if the current count value does not reach the predetermined count value, the processing unit 30 determines that the driving path P of the approaching vehicle V does not fulfill the confirmation condition in the warning area L.

In an embodiment of the present invention, the predetermined count value is 5, and the current count value counts from 0 to 5. When the approaching vehicle V is out of the warning area L, the current count value remains at 0. When the approaching vehicle V enters the warning area L, the current count value starts to count. When the current count value is equal to 5, the current count values reaches the predetermined count value. The predetermined count value and the current count value are allowed to be adjusted based on different situations and not limited to the aforementioned values.

Figure 3:
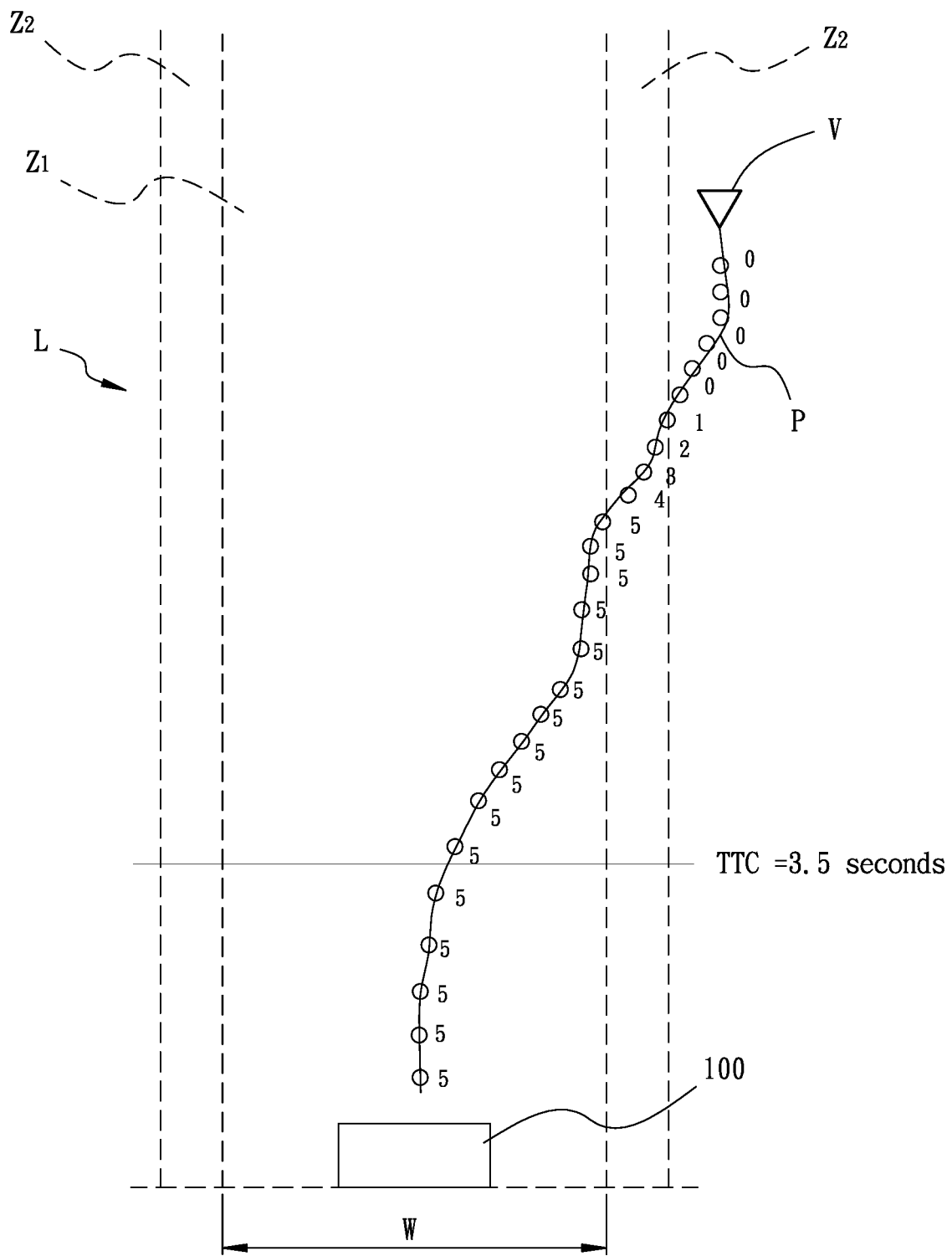
FIG. 3 is a schematic view of the warning system and method in accordance with an embodiment of the present invention, illustrating that the approaching vehicle reaches a warning triggering status.
Figure 4:
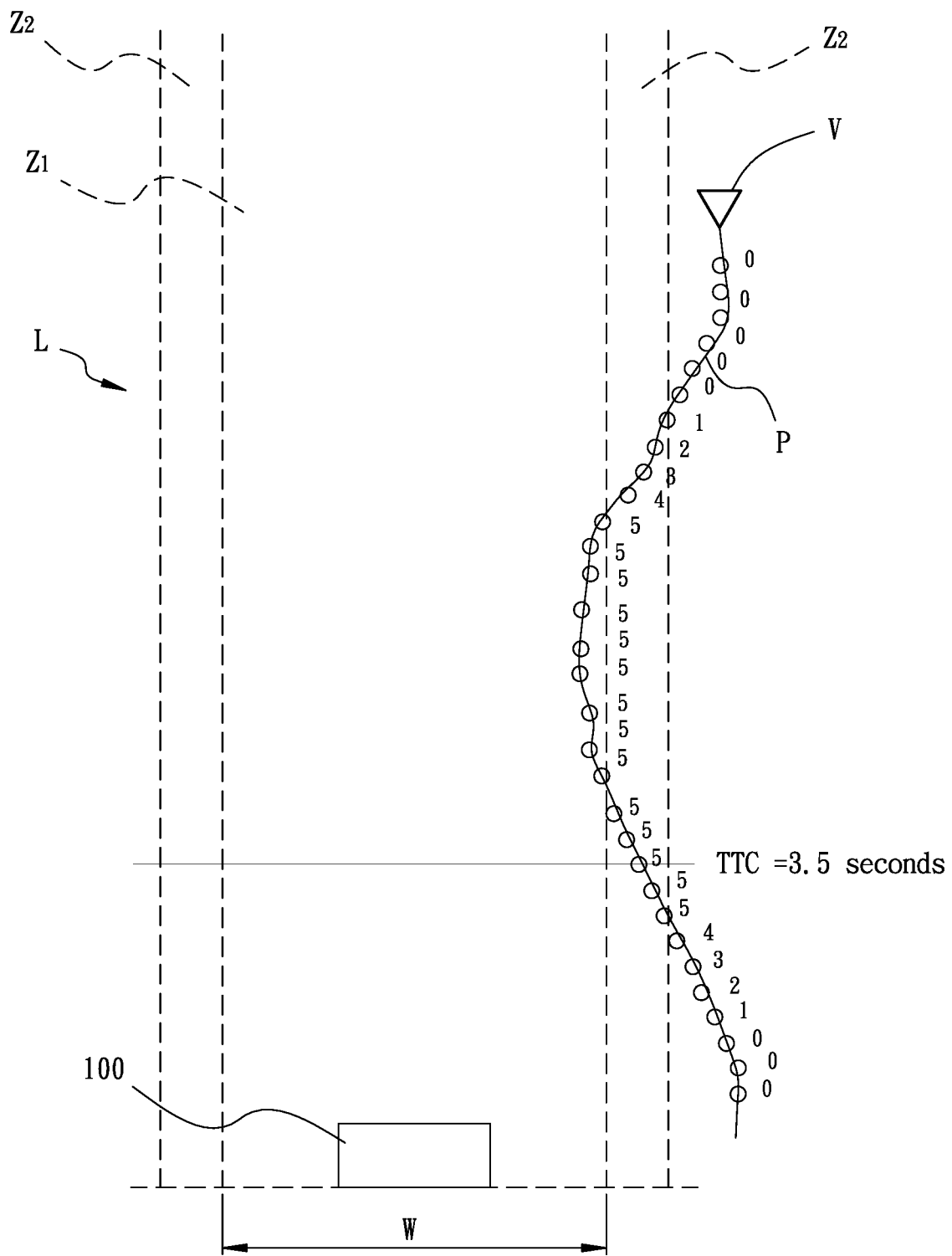
FIG. 4 is a schematic view of the warning system and method in accordance with an embodiment of the present invention, illustrating that the approaching vehicle does not reach a warning triggering status.

The warning system 100 for detecting an approaching vehicle in an embodiment of the present invention includes a "straight line mode" and a "curve line mode". In the straight line mode, the warning area L includes a straight line warning zone Z1 and a buffering warning zone Z2 (as shown by FIG. 3 and FIG. 4). The buffering zone Z2 expands outward from the straight line warning zone Z1. The straight line warning zone Z1 is formed by an expansion of the predetermined width W which is detectable by the detection unit 10. In an embodiment of the present invention, the straight line warning zone Z1 is formed by a straight expansion of the predetermined width W expanding toward a same direction, and the buffering zone Z2 is an expansion of the straight line warning zone Z1 which symmetrically expands toward two sides thereof by an identical distance.

Figure 2:
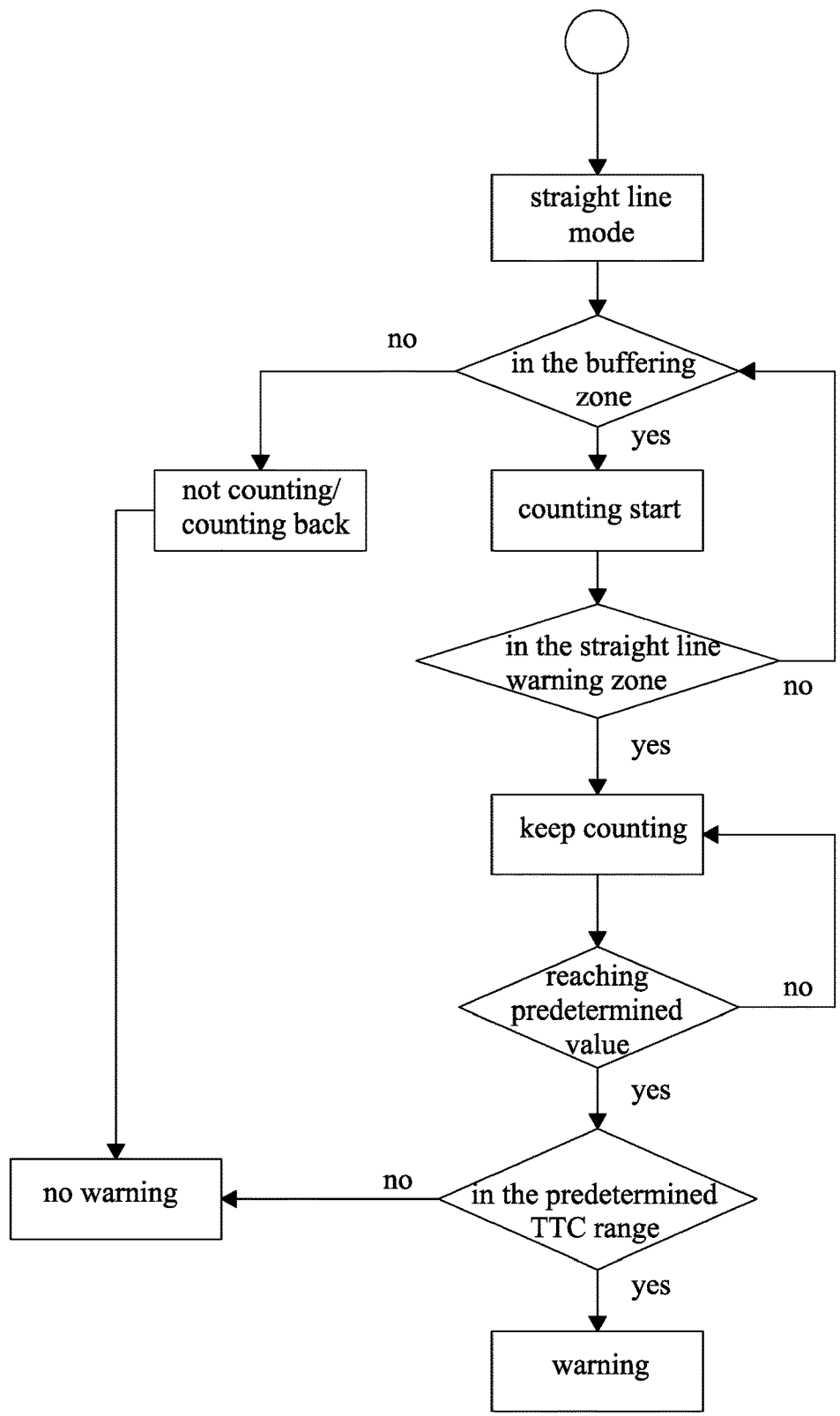
FIG. 2 is a flow chart illustrating the warning system and method in accordance with an embodiment of the present invention under the straight line mode.

Referring to FIG. 2, accompanied by FIG. 3, the process of detecting the approaching vehicle V in the "straight line mode" is illustrated. When the approaching vehicle V does not enter the buffering zone Z2, the counting process of the current count value is not triggered, meaning that the approaching vehicle V does not enter the warning area L. At the meantime, the warning system 100 is in a stand by status. When the approaching vehicle V enters the buffering zone Z2, the current count value starts to count from 0 to 5. In the process, if the approaching vehicle V leaves the buffering zone Z2, the current count value stops increasing and starts to decrease back to the value 0. No matter the approaching vehicle V is in the buffering zone Z2 or enters the straight line warning zone Z1 from the buffering zone Z2, the current count value will keep counting from 0 to 5. Once upon the current count value reaching the value of 5, based on the fact that the current count values reaches the predetermined count value, the processing unit 30 will determine that the driving path P of the approaching vehicle V fulfills the confirmation condition in the warning area L.

Accordingly, if the processing unit 30 determines that the driving path P of the approaching vehicle V is in the straight line warning zone Z1, and the driving path P of the approaching vehicle V also fulfills the confirmation condition, the processing unit 30 will then determine if the time to collision of the approaching vehicle V is equal to or shorter than the predetermined time to collision which is set as 3.5 seconds (in the 3.5 seconds range). In other words, when the processing unit 30 determines that the time to collision of the approaching vehicle V is larger than the predetermined time to collision of 3.5 seconds, the warning system 100 will not send the warning signal. On the contrary, if the processing unit 30 determines that the time to collision of the approaching vehicle V is equal to or shorter than the predetermined time to collision of 3.5 seconds, the approaching vehicle V is deemed as a potentially dangerous vehicle. Subsequently, the warning signal is output for warning (such as a buzzer or flash). Therefore, the people in or beside the malfunctioned vehicle are aware of the potentially dangerous vehicle and allowed to duck as soon as possible.

Further referring to FIG. 4, similarly, the processing unit 30 determines that the driving path P of the approaching vehicle V is in the straight line warning zone Z1, and the driving path P of the approaching vehicle V also fulfills the confirmation condition. However, before the time to collision reaches within the predetermined time to collision of 3.5 seconds, the approaching vehicle V moves out of the straight line warning zone Z1. Even if the time to collision of the approaching vehicle V reaches the predetermined time to collision range later, based on the fact that the approaching vehicle V has moved out of the straight line warning zone Z1 and will not cause any danger upon the people in or beside the malfunctioned vehicle, the processing unit 30 will not output the warning signal, so as to prevent the people in or beside the malfunctioned vehicle from fearing or panicking.

Figure 5:
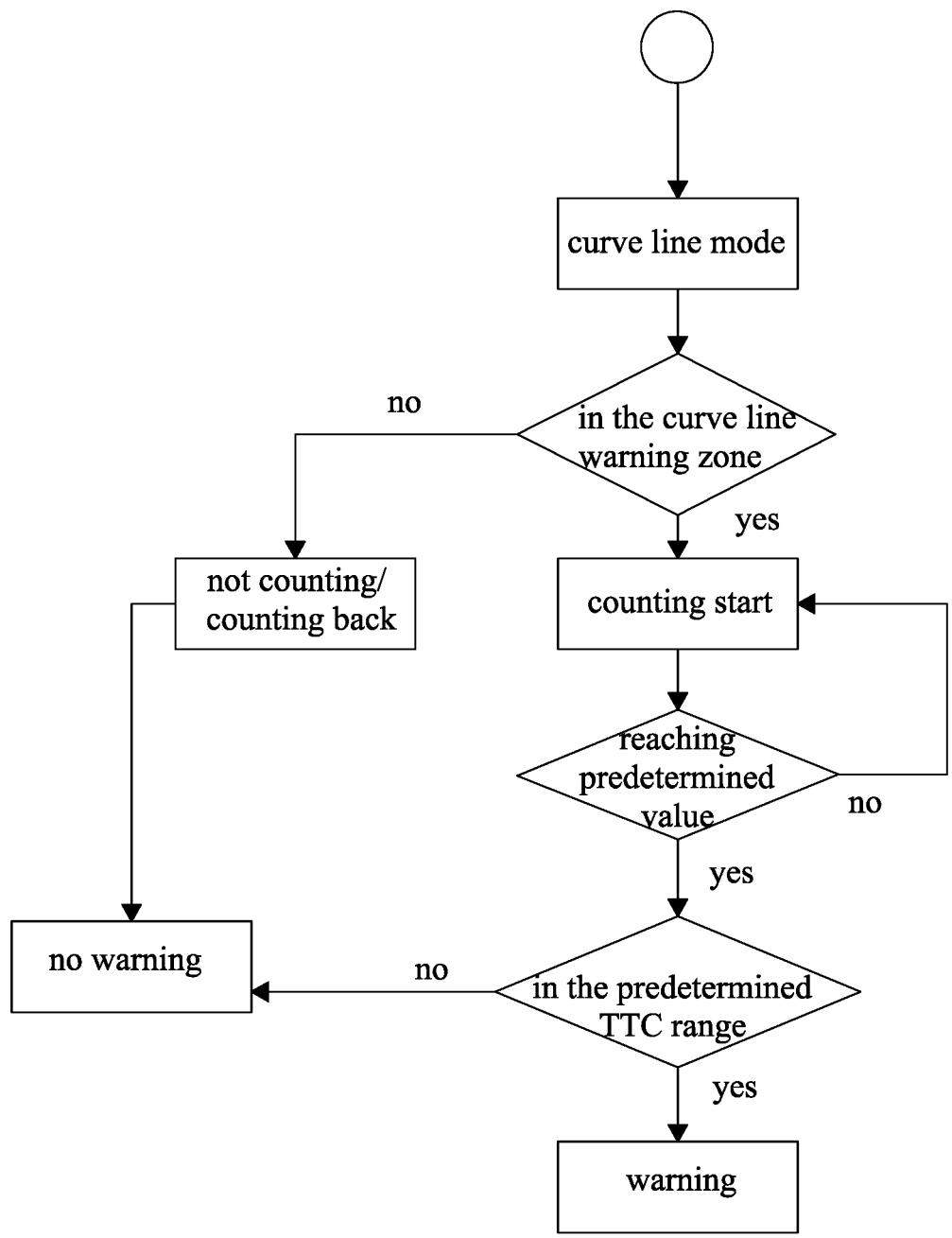
FIG. 5 is a flow chart illustrating the warning system and method in accordance with an embodiment of the present invention under the curve line mode.
Figure 6:
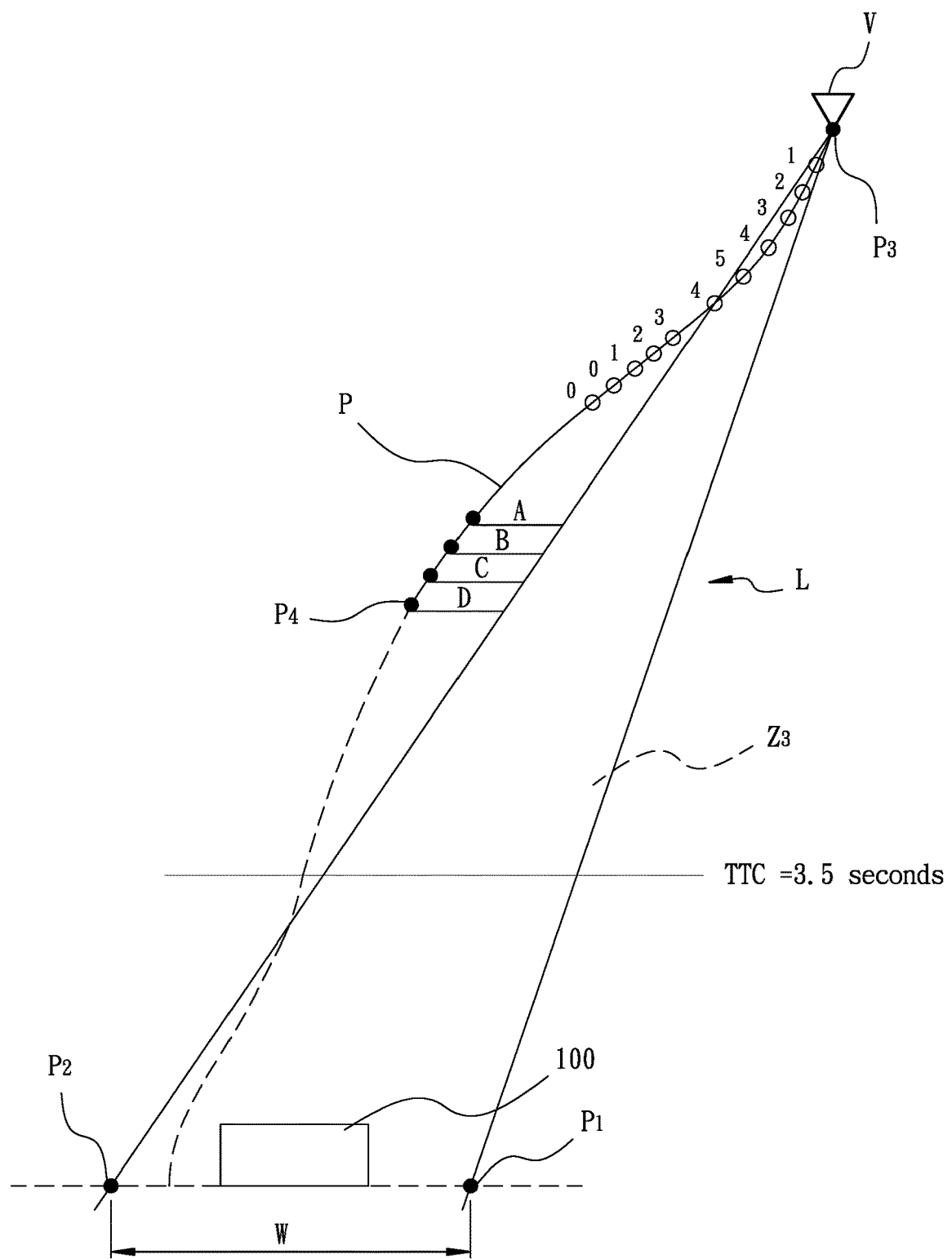
FIG. 6 is a schematic view of the warning system and method in accordance with an embodiment of the present invention, illustrating that the approaching vehicle does not reaching a warning triggering status.
Figure 7:
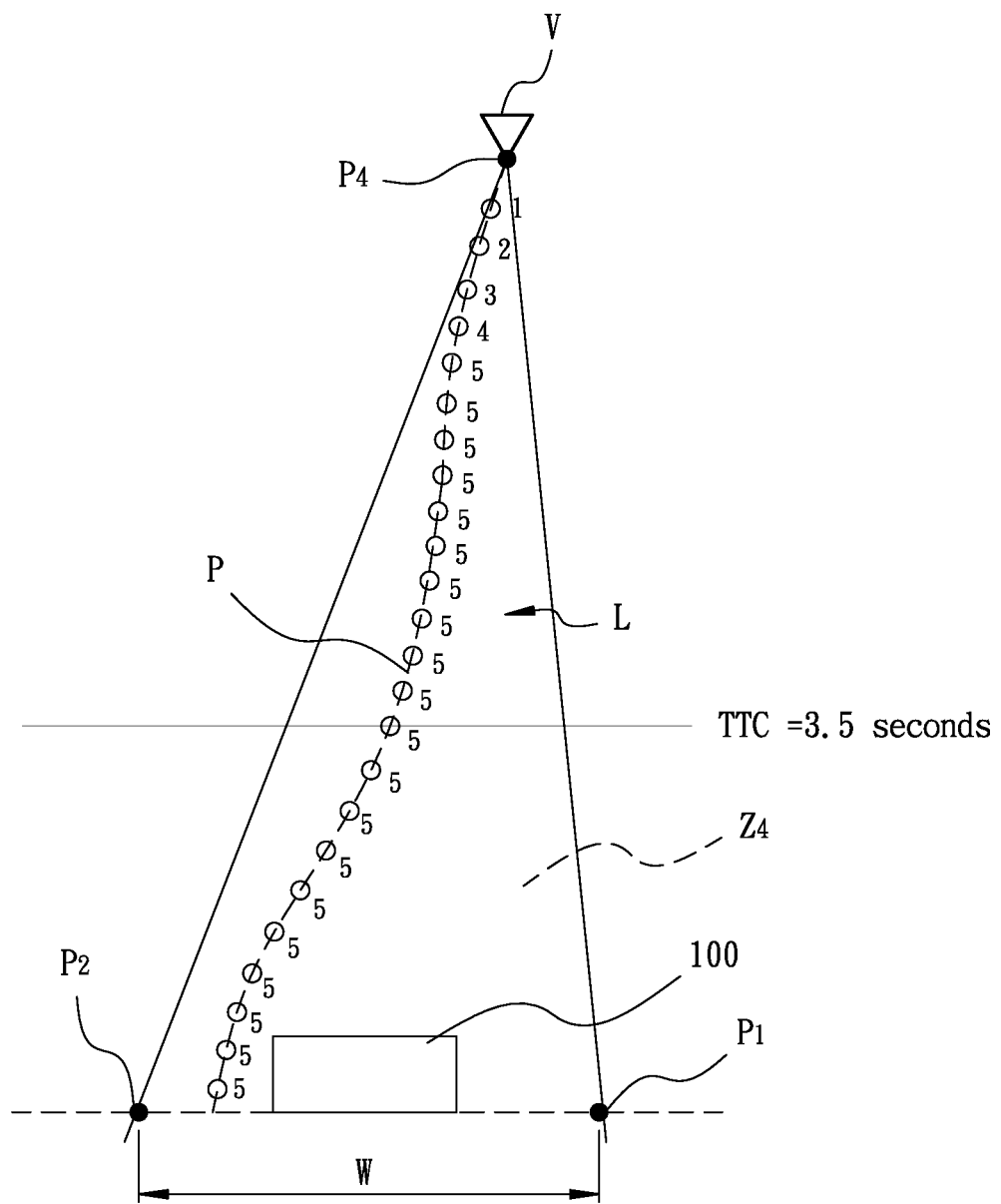
FIG. 7 is a schematic view of the warning system and method in accordance with an embodiment of the present invention, illustrating that the approaching vehicle reaches a warning triggering status.

In an embodiment of the present invention, in the "curve line mode" as shown by FIG. 6 and FIG. 7, a curve line warning zone Z3 is formed in a triangle area which is defined by the connections between a point P1, a point P2, and a point P3, wherein the point P1 and the point P2 are two distal end points of the predetermined width W, and the point P3 is the position of the approaching vehicle V. As shown by FIG. 5, accompanied by FIG. 6, the process of detecting the approaching vehicle V in the "curve line mode" is illustrated. When the approaching vehicle V does not enter the curve line warning zone Z3, the counting process of the current count value is not triggered, meaning that the approaching vehicle V does not enter the warning area L. At the meantime, the warning system 100 is in the stand by status. When the approaching vehicle V enters the curve line warning zone Z3, the current count value starts to count from 0 to 5. In the process, if the approaching vehicle V leaves the curve line warning zone Z3, the current count value stops increasing and starts to decrease back to the value 0.

Referring to FIG. 6 and FIG. 7, the driving path P of the approaching vehicle V varies, such as leaving the curve line warning zone Z3, and further fulfilling a moving away condition. In an embodiment of the present invention, the moving away condition is that, when the driving path P of the approaching vehicle V deviates away from the curve line warning zone Z3, four path points A, B, C, and D on the driving path P are captured (as shown by FIG. 6), such that the processing unit 30 compares the first path point A and the fourth point D to determine that the direction from point A to point D faces away from the curve line warning zone Z3. In such situation, a new curve line warning zone Z4 is defined by the point P1, the point P2, and the position of the approaching vehicle V which fulfills the moving away condition (as shown by FIG. 7). Such step is repeatedly carried out, until the driving path P fulfills the confirmation condition and the processing unit 30 accordingly sends the warning signal, or until the approaching vehicle V passes the detection unit 10 and leaves away. In contrast, if the direction from the first path point A to the fourth path point D is not facing away from the curve line warning zone Z3, the moving away condition is not fulfilled, wherein the original curve line warning zone Z3 will not be re-defined.

In the "curve line mode", during the current count value counting from 0 to 5, if the approaching vehicle V enters the curve line warning zone Z3 or the curve line warning zone Z4, and upon the current count value reaching the value of 5, based on the fact that the current count value reaches the predetermined count value, the processing unit 30 will determine that the driving path P of the approaching vehicle V fulfills the confirmation condition in the warning area L. Accordingly, if the processing unit 30 determines that the driving path P of the approaching vehicle V is in the curve line warning zone Z3 or the curve line warning zone Z4, and the driving path P of the approaching vehicle V also fulfills the confirmation condition, the processing unit 30 will then determine if the time to collision of the approaching vehicle V is equal to or shorter than the predetermined time to collision which is set as 3.5 seconds. In other words, when the processing unit 30 determines that the time to collision of the approaching vehicle V is larger than the predetermined time to collision of 3.5 seconds, the warning system 100 will not send the warning signal. On the contrary, if the processing unit 30 determines that the time to collision of the approaching vehicle V is equal to or shorter than the predetermined time to collision of 3.5 seconds (as shown by FIG. 7), the approaching vehicle V is deemed as a potentially dangerous vehicle. Subsequently, the warning signal is output for warning. Therefore, the people in or beside the malfunctioned vehicle are aware of the potentially dangerous vehicle and allowed to duck as soon as possible. However, if the approaching vehicle V moves out of the curve line warning zone Z4 (not shown), even if the time to collision of the approaching vehicle V reaches the predetermined time to collision range later, based on the fact that the approaching vehicle V will not cause any danger upon the people in or beside the malfunctioned vehicle, the processing unit 30 will not output the warning signal, so as to prevent the people in or beside the malfunctioned vehicle from fearing or panicking.

The descriptions above illustrate the operation in the "straight line mode" and the "curve line mode", respectively. In practical application, two modes are allowed to be independently executed for detecting the approaching vehicle V, or simultaneously or alternately executed for detecting the approaching vehicle V. Therefore, the application of the detection modes is flexible, further preventing possible incorrect judgement.

With the foregoing configuration, the warning system 100 and method for detecting an approaching vehicle V provided by the present invention achieve following effects and functions.

With the detection unit 10 detecting the time to collision of the approaching vehicle V, the approaching vehicle V will be deemed as a potentially dangerous vehicle when the following requirements are met: the processing unit 30 determines that the time to collision is in the range of a predetermined time to collision; the driving path P of the approaching vehicle V is in the warning area L; and the driving path P fulfills the confirmation condition. When the requirements above are met, the processing unit 30 sends out the warning signal. Therefore, an incorrect judgement of a potentially dangerous vehicle is prevented, further preventing people from fearing or panicking due to an incorrect warning.

When the driving path P of the approaching vehicle V enters from a lateral side, the curve mode of the present invention facilitates an optimal detection and warning performance. Also, the range of the warning zone is allowed to be adjusted according to the driving path P of the approaching vehicle V (such as the curve line warning zone Z3 being adjusted into the curve line warning zone Z4), thereby accurately detecting the driving path P of the approaching vehicle V.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A warning system for detecting an approaching vehicle, comprising:
    a detection unit detecting a relative distance with respect to the approaching vehicle in a detection area to acquire a time to collision (TTC), and detecting a driving path of the approaching vehicle, such that the time to collision and the driving path are transformed into a detection signal to be output;
    a storage unit storing a warning information, the warning information including a predetermined time to collision, a warning area set in the detection area, and a confirmation condition for confirming that the approaching vehicle continuously moves in the warning area; and
    a processing unit electrically connected with the detection unit and the storage unit, the processing unit receiving the detection signal to acquire the current time to collision and the current driving path;
    when the time to collision is equal to or shorter than the predetermined time to collision, and the driving path falls in the warning area, and the driving path fulfills the confirmation condition, the processing unit sends a warning signal.

2. The warning system of claim 1, wherein the confirmation condition is a predetermined count value; when the approaching vehicle enters the warning area, a current count value will start to count; if the current count value reaches the predetermined count value, the processing unit determines that the driving path fulfills the confirmation condition in the warning area; if the current count value is smaller than the predetermined count value, the processing unit determines that the driving path does not fulfill the confirmation condition in the warning area.

3. The warning system of claim 2, wherein the warning area includes a warning zone, and the warning zone is formed by an expansion of a predetermined width which is detectable by the detection unit.

4. The warning system of claim 3, wherein the warning zone is a straight line warning zone formed by a straight expansion of the predetermined width expanding toward a same direction, and the warning area has a buffering zone on two sides of the straight line warning zone, respectively; the buffering zone is an expansion of the straight line warning zone which symmetrically expands toward two sides thereof by an identical distance; when the approaching vehicle enters the buffering zone, the current count value starts to count.

5. The warning system of claim 3, wherein the warning zone is a curve line warning zone formed in a triangle area which is defined by a connection between three points, wherein two of the three points are two distal end points of the predetermined width, and the last one of the three point is a position of the approaching vehicle; when the driving path of the approaching vehicle leaves the curve line warning zone and a moving away condition is fulfilled, the curve line warning zone is redefined and a triangle area defined by a connection between the two distal ends of the predetermined width and a position at where the approaching vehicle is when fulfilling the moving away condition; such operation is repeatedly carried out until the driving path fulfills the confirmation condition and the processing unit accordingly sends the warning signal, or until the approaching vehicle passes the detection unit and leaves away.

6. The warning system of claim 5, wherein the moving away condition is that when the approaching vehicle moves away from the curve line warning zone, a plurality of path points are captured along the driving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

7. The warning system of claim 4, further comprising a curve line warning zone formed in a triangle area which is defined by a connection between three points, wherein two of the three points are two distal end points of the predetermined width, and the last one of the three point is a position of the approaching vehicle; when the driving path of the approaching vehicle leaves the curve line warning zone and a moving away condition is fulfilled, the curve line warning zone is redefined and a triangle area defined by a connection between the two distal ends of the predetermined width and a position at where the approaching vehicle is when fulfilling the moving away condition; such operation is repeatedly carried out until the driving path fulfills the confirmation condition and the processing unit accordingly sends the warning signal, or until the approaching vehicle passes the detection unit and leaves away.

8. The warning system of claim 7, wherein the moving away condition is that when the approaching vehicle moves away from the curve line warning zone, a plurality of path points are captured along the driving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

9. A warning method for detecting an approaching vehicle, comprising following steps:
    detecting a relative distance with respect to the approaching vehicle in a detection area to acquire a time to collision and detecting a driving path of the approaching vehicle with a detection unit, transforming the time to collision and the driving path into a detection signal, and outputting the detection signal;
    storing a warning information with a storage unit, the warning information including a predetermined time to collision, a warning area set in the detection area, and a confirmation condition for confirming that the approaching vehicle continuously moves in the warning area; and
    receiving the detection signal with a processing unit which is electrically connected with the detection unit and the storage unit to acquire the current time to collision and the current driving path of the approaching vehicle, such that when the time to collision is equal to or shorter than the predetermined time to collision, and the driving path falls in the warning area, and the driving path fulfills the confirmation condition, the processing unit sends a warning signal.

10. The method of claim 9, wherein the confirmation condition is a predetermined count value; when the approaching vehicle enters the warning area, a current count value will start to count; if the current count value reaches the predetermined count value, the processing unit determines that the driving path fulfills the confirmation condition in the warning area; if the current count value is smaller than the predetermined count value, the processing unit determines that the driving path does not fulfill the confirmation condition in the warning area.

11. The method of claim 10, wherein the warning area includes a warning zone, and the warning zone is formed by an expansion of a predetermined width which is detectable by the detection unit.

12. The method of claim 11, wherein the warning zone is a straight line warning zone formed by a straight expansion of the predetermined width expanding toward a same direction, and the warning area has a buffering zone on two sides of the straight line warning zone, respectively; the buffering zone is an expansion of the straight line warning zone which symmetrically expands toward two sides thereof by an identical distance; when the approaching vehicle enters the buffering zone, the current count value starts to count.

13. The method of claim 11, wherein the warning zone is a curve line warning zone formed in a triangle area which is defined by a connection between three points, wherein two of the three points are two distal end points of the predetermined width, and the last one of the three point is a position of the approaching vehicle; when the driving path of the approaching vehicle leaves the curve line warning zone and a moving away condition is fulfilled, the curve line warning zone is redefined and a triangle area defined by a connection between the two distal ends of the predetermined width and a position at where the approaching vehicle is when fulfilling the moving away condition; such operation is repeatedly carried out until the driving path fulfills the confirmation condition and the processing unit accordingly sends the warning signal, or until the approaching vehicle passes the detection unit and leaves away.

14. The method of claim 13, wherein the moving away condition is that when the approaching vehicle moves away from the curve line warning zone, a plurality of path points are captured along the driving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

15. The method of claim 12, further comprising a curve line warning zone formed in a triangle area which is defined by a connection between three points, wherein two of the three points are two distal end points of the predetermined width, and the last one of the three point is a position of the approaching vehicle; when the driving path of the approaching vehicle leaves the curve line warning zone and a moving away condition is fulfilled, the curve line warning zone is redefined and a triangle area defined by a connection between the two distal ends of the predetermined width and a position at where the approaching vehicle is when fulfilling the moving away condition; such operation is repeatedly carried out until the driving path fulfills the confirmation condition and the processing unit accordingly sends the warning signal, or until the approaching vehicle passes the detection unit and leaves away.

16. The method of claim 15, wherein the moving away condition is that when the approaching vehicle moves away from the curve line warning zone, a plurality of path points are captured along the driving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

* * * * *